E. Bates, J. & M. Weist,
Shoe Float,
No. 27,514. Patented Mar. 20, 1860

Witnesses.
George A. Shutter
John W. Buckingham

Inventor.
Emanuel Bates
Jacob Wiest
Michael Wiest

UNITED STATES PATENT OFFICE.

E. BATES, JACOB WIEST, AND MICHAEL WIEST, OF YORK, PENNSYLVANIA.

SHOEMAKER'S FLOAT.

Specification of Letters Patent No. 27,514, dated March 20, 1860.

*To all whom it may concern:*

Be it known that we, E. BATES, JACOB WIEST, and MICHAEL WIEST, all of York, in the county of York and State of Pennsylvania, have invented a new and Improved Shoemaker's Float; and we do hereby declare that the following is a full, clear, and exact description of the same, reference being had to the annexed drawings, making a part of this specification, in which—

Figure 1:
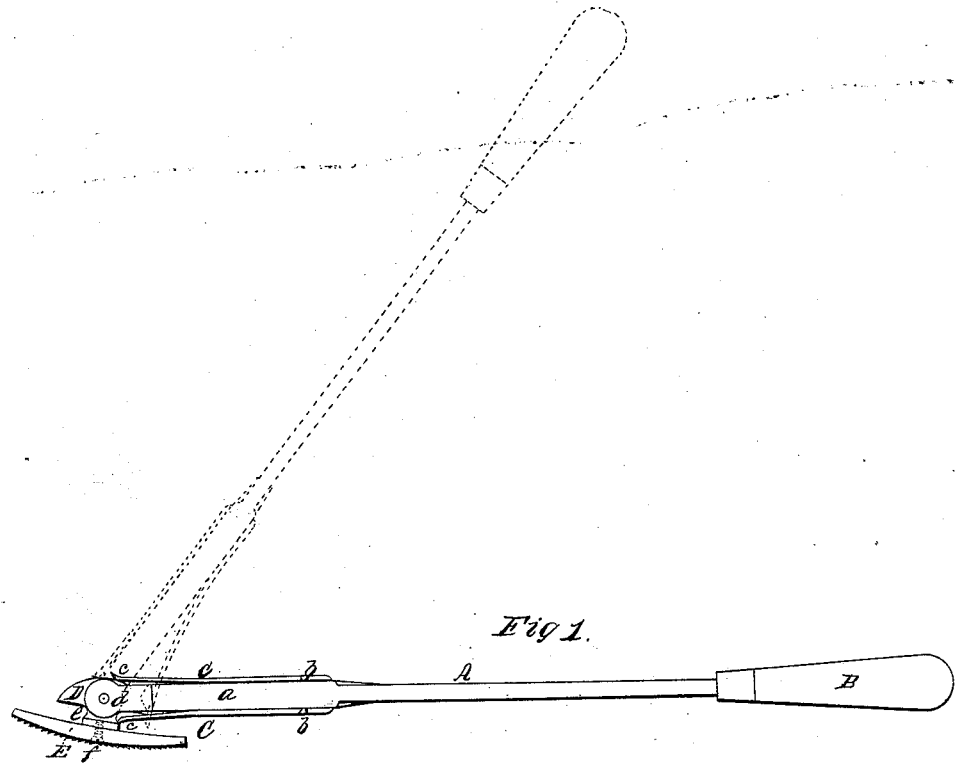
Figure 2:
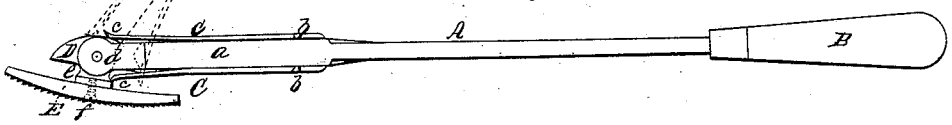
Figure 3:
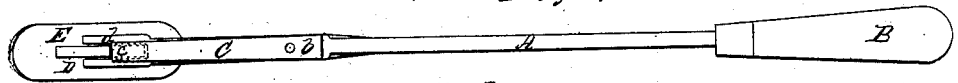

Figure 1, is a side view of our invention. Fig. 2 a top view of ditto. Fig. 3, a detached longitudinal section of the float and dog.

Similar letters of reference indicate corresponding parts in the several figures.

This invention relates to an improvement in the tool used by shoemakers for rasping off the ends of projecting pegs inside of boots and shoes, and which tool is technically termed a float.

The invention consists in a peculiar means employed for admitting of the self-adjustment of the float and handle, and at the same time holding the float sufficiently firm in any position relatively with the handle that may be required in using the tool.

To enable those skilled in the art to fully understand and construct our invention, we will proceed to describe it.

A, represents a metal rod or shank, to one end of which a wooden handle B, is attached. The rod or shank at its opposite end is made of rectangular form as shown at *a*, and it has springs C, C, attached to it at two opposite sides. These springs are made of steel and they are attached to the rod or shank as shown at *b*. The free or disengaged ends of the springs C, C, are slightly curved outward as shown at *c*, in Fig. 1.

To the outer end of the rectangular part *a*, of the rod or shank, a segmental dog D, is attached by a joint or pivot *d*, said dog being allowed to turn freely at the end of the rod or shank. The dog D, is provided with a neck *e* which projects from the center of its plane surface and to which the float E is attached by a screw *f*.

The float E is constructed in the usual way, to wit, a curved steel plate cut or corrugated on its outer or face side to form cutters, or a rasp, those on one half of the float being in a reverse position to those on the other half, in order that the float may cut while being shoved in either direction.

The curved ends of the springs C, C, bear on the curved surface of the dog D, when the rod or shank A is in one position relatively with the float as shown in Fig. 1. One spring C, is below one end of the dog, the other spring C, bearing on the curved surface, or face of the dog. When the rod or shank is in an opposite position, relatively with the dog, the other spring C, will be below the opposite end of the dog. These springs and the dog retain the float and rod or shank in different positions relatively with each other, as the nature of the work may require. One of the springs bears upon the front part of the dog, and tends to bear or press down the front end of the float or rasp, and the other spring bears against the rear end of the dog, and tends to pull it up, thus assisting the downward pressure of the front of the float or rasp, which is thus made to act more effectually upon the pegs.

By this arrangement it will be seen that the parts are self-adjusting, that is to say, the float does not as in all other implements of the kind that have passed under our observation require to be specially adjusted relatively with the shank or handle at each change of the position of said parts relatively with each other. The invention is an extremely simple one, and it may be manufactured at a small cost. The invention also admits of the ready adjustment of new floats when required, as the float is secured by a screw to the neck of the dog.

Having thus described our invention, what we claim as new, and desire to secure by Letters Patent, is—

The combination of the curved dog D, with the float or rasp E, springs C, C, and rod A when arranged and constructed as and for the purpose herein shown and described.

EMANUEL BATES.
JACOB WIEST.
MICHAEL WIEST.

Witnesses:
GEORGE M. SHELTER,
JOHN W. BUCKINGHAM.